June 23, 1959  R. F. PARK ET AL  2,892,068
METHODS OF AND MEANS FOR ELECTRIC WELDING
Filed April 19, 1956  2 Sheets-Sheet 1

Inventors
Rodney F. Park
Jerome B. Welch
By H R Rather
Attorney

June 23, 1959   R. F. PARK ET AL   2,892,068
METHODS OF AND MEANS FOR ELECTRIC WELDING
Filed April 19, 1956
2 Sheets-Sheet 2

Inventors.
Rodney F. Park.
Jerome B. Welch.
By H. R. Ritter
Attorney

United States Patent Office 2,892,068
Patented June 23, 1959

2,892,068
METHODS OF AND MEANS FOR ELECTRIC WELDING

Rodney F. Park, Elm Grove, and Jerome B. Welch, Wauwatosa, Wis., assignors to Cutler-Hammer, Inc., Milwaukee, Wis., a corporation of Delaware Application April 19, 1956, Serial No. 579,302

39 Claims. (Cl. 219—86)

This invention relates to improved methods of and means for electric welding.

A primary object of the invention is to provide an improved method of obtaining a desired relation between the initiation of flow of welding current and the build-up of force on the work pieces as imparted through the movable electrode in a welder.

A more specific object is to provide means for automatically obtaining and controlling the aforementioned relation.

Another primary object of the invention is to provide an improved method of magnetic force welding wherein a delayed forging action is imparted to the work pieces following initiation of flow of welding current whereby the total weld area between mated parts is increased and the homogeneity of such weld area is enhanced.

A further specific object is to provide means for adjustably controlling the degree and time relation of such forging action with respect to welding current flow in magnetic force welders, and A still further specific object is to provide an improved electric welder which may be selectively operated either as a resistance welder, as a magnetic force welder, or as a magnetic force welder with delayed forging action.

Other objects and advantages of the invention will hereinafter appear.

While the apparatus and methods hereinafter described are effectively adapted to fulfill the objects stated, it is to be understood that we do not intend to confine our invention to the particular preferred embodiment and methods of welding disclosed, inasmuch as they are susceptible of various modifications without departing from the scope of the appended claims.

Referring to the accompanying drawings.

Figure 1:
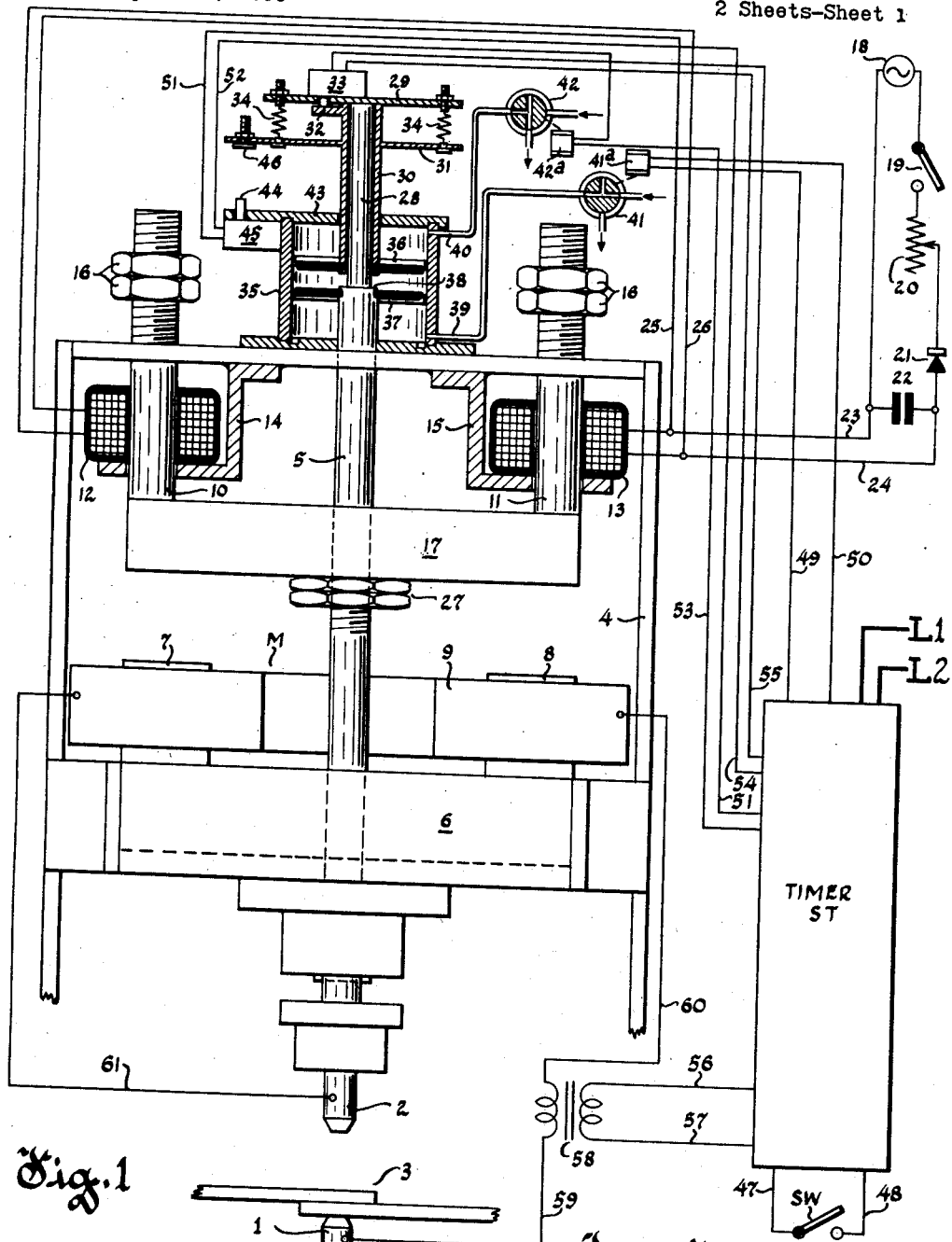
Figure 1 illustrates an electric welder constructed in accordance with the present invention.

Referring to Fig. 1, the welder comprises an adjustable lower welding electrode 1 and a movably supported upper welding electrode 2 which cooperates with the lower electrode to weld the work pieces indicated generally at 3. Mounted on a stationary frame 4 is apparatus for imparting a force to the upper electrode 2 through a main shaft 5 to apply a controlled force on the work pieces. Supported on frame 4 at its lower portion is a magnetic force means, indicated generally at M, comprising a U-shaped magnetic core 6 having pole pieces 7 and 8. Core 6 is preferably of laminated construction to reduce eddy current losses. Surrounding the upwardly extending pole pieces 7 and 8 is a winding 9. Reference should be made to Jerome B. Welch copending application Serial No. 361,587, filed June 15, 1953, now Patent No. 2,776,362, dated January 1, 1957, for a more detailed description of the aforedescribed magnetic force means.

Extending through the top portion of frame 4 are movable cores 10 and 11 that are surrounded by energizing coils 12 and 13, respectively. The energizing coils are supported on brackets 14 and 15 secured to the frame 4. Cores 10 and 11 are threaded adjacent their upper ends and a pair of nuts 16, the upper one of which is a locking nut, are adjustable thereon so that the lengths of the cores extending down into the frame toward armature 17 may be varied for the reasons hereinafter set forth. The energizing circuit for coils 12 and 13, as seen at the upper right-hand portion of Fig. 1, comprises in series connection an alternating current source 18, on-off switch 19, an adjustable resistor 20, and rectifier 21 and a smoothing capacitor 22 connected across conductors 23 and 24 which are connected to coil 13 and through conductors 25 and 26 to coil 12.

The main shaft 5 extending upwardly from the upper movable electrode 2 is threaded intermediate its ends and a pair of nuts, the lower one of which is a locking nut, are adjustable thereon to provide an adjustable stop 27 for armature 17 when the latter is attracted by magnetic force means M for the reasons hereinafter set forth. The part of main shaft 5 extending above frame 4 has a reduced end portion 28 terminating at a plate 29 which is secured to its upper end. The reduced end portion 28 is surrounded by a slidable cylindrical sleeve 30, which has secured thereto a plate 31, and an arm 32 for operating a sensitive switch 33 which is adjustably mounted above plate 29. Plate 29 is apertured to accommodate the actuator of switch 33. Plates 29 and 31 are connected by a plurality of preloaded biasing springs 34, which are secured at their upper ends to plate 29 by any suitable means, such as for example the adjustable bolts and nuts shown which readily permit substitution of weaker or stronger springs. Mounted above frame 4 is a fluid cylinder 35 which partly surrounds a portion of main shaft 5 and a part of its reduced end portion 28 and sleeve 30. Cylinder 35 is divided into upper and lower chambers by means of disk-like pistons 36 and 37, piston 36 being secured to sleeve 30, and piston 37 being secured to main shaft 5 directly below shoulder 38. Each piston comprises an L-section of leather or other suitable flexible sealing material gripped between a pair of rigid disks. The fluid chambers of cylinder 35 are closed except at the entrance of conduits 39 and 40 whereby air or other fluid is fed into and exhausted from the cylinder chambers by solenoid operated valves 41 and 42 having solenoids 41a and 42a. Valve 41 is shown as being in its air supply position and valve 42 is shown in its exhaust position. An extension on the cylinder top plate 43 is apertured to accommodate actuator 44 of a second sensitive switch 45 which is mounted below the extension. Plate 31 carries an adjustable member 46 in axial alinement and cooperating with actuator 44 to operate switch 45.

At the right-hand portion of Fig. 1 conductors L1 and L2 connect an alternating current supply source (not shown) to a synchronous timer ST which is schematically depicted. It may be assumed that timer ST is a well known type of synchronous welding timer, such as that designated and disclosed as the "S2H Timer" in NEMA Standards, Resistance Welding Control Publication IC2, 1955. Detailed description of this timer is herein omitted for the sake of simplicity.

Starting switch SW is connected to timer ST by conductors 47 and 48. Timer ST is connected through conductors 49 and 50 to solenoid 41ᵃ of valve 41. It may be assumed that with starting switch SW open solenoid 41ᵃ will be deenergized to maintain valve 41 in its air supply position and with switch SW closed solenoid 41ᵃ will be energized and valve 41 will be in its exhaust position. Timer ST is series connected to sensitive switch 45 through conductor 51, conductor 52, solenoid 42ᵃ and conductor 53. It may also be assumed that with starting switch SW open conductors 51 and 53 will be deenergized, and with switch SW closed timer ST will apply a voltage to conductors 51 and 53 to prepare an operating circuit for solenoid 42ᵃ of valve 42 to be completed upon subsequent closure of switch 45.

Sensitive switch 33 which is maintained in its circuit opening positon by biasing springs 34 is connected to timer ST through conductors 54 and 55. It may further be assumed that closing of starting switch SW will afford sensitive switch 33 control over the timer to initiate the welding current.

Timer ST is further coupled to the welding electrodes 1 and 2 through conductors 56 and 57 to transformer 58 and then through conductor 59 to lower electrode 1 and through conductor 60, coil 9 and conductor 61 to movable upper electrode 2.

The operation of the resistance welder will now be described.

Let it be assumed that the lines L1 and L2 are energized and switch SW of timer ST is open. Then conductors 49, 50, 51 and 53 will all be deenergized and valves 41 and 42 will assume their operating positions depicted in Fig. 1 wherein air will be supplied to the lower chamber and exhausted from the upper chamber of cylinder 35 to drive shaft 5 and electrode 2 to the upper extreme positions depicted in Fig. 1. Also let it be assumed that switch 19 is cloesd to supply rectified alternating current through conductors 23, 24 and 25, 26 and the windings of coils 12 and 13, and that nuts 16 on cores 10 and 11 are turned all the way down thereon to raise armature 17 outside of the effective magnetic field of magnetic force device M.

When starting switch SW is closed it may be assumed that solenoid 41ᵃ is energized through conductors 49 and 50 to operate valve 41 to exhaust the air from the lower chamber of cylinder 35. Main shaft 5 is thus permitted to move downwardly by gravity at a controlled rate as determined by the rate of exhaustion of air from the lower cylinder chamber through conduit 39 and valve 41, and move upper electrode 2 into engagement with the work pieces. Main shaft 5, in moving downwardly, carries with it its end plate 29 and sleeve 30. Member 46 engages actuator 44 to close switch 45 when shaft 5 reaches its lower position. It may be assumed that closure of switch 45 completes a circuit through conductors 51 and 52, solenoid 42ᵃ and conductor 53 to timer ST to operate valve 42 to a position wherein compressed air is supplied to the upper chamber of cylinder 35. Thus, piston 36 moves downwardly and applies a force to the upper end of shaft 5 through sleeve 30, plate 31, springs 34 and plate 29. When air pressure is initially supplied to the upper chamber of the cylinder, the main shaft and sleeve assembly will remain in their initial positions relative to one another until the parts to be welded are in contact and a force is built up that exceeds the restraining force of the springs 34. As the air pressure continues to build up in the upper chamber of the air cylinder, springs 34 stretch until the lower end of sleeve 30 abuts against shoulder 38 of the main shaft. The force created by any further increase in air pressure in the upper chamber will thereafter be transmitted at shoulder 38 directly to the main shaft and, consequently, through the upper movable electrode 2 to the parts to be welded. As the springs 34 stretch, sleeve 30 slides on reduced portion 28 of the main shaft and moves away from plate 29 carrying with it arm 32, thereby releasing the actuator of switch 33 to afford closure of the latter. It may be assumed that when switch 33 is closed, timer ST is operated to supply welding current to the primary winding of transformer 58 through conductors 56 and 57. The welding current then flows from the upper end of the secondary winding through conductor 60, coil 9, conductor 61, upper electrode 2, work pieces 3, lower electrode 1 and conductor 59 to the lower end of the secondary winding.

Figure 4:
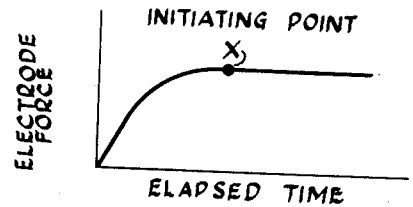
Fig. 4 depicts the point of welding current initiation for a conventional resistance welder.

As illustrated in Fig. 4, with a conventional resistance welder it is customary practice to initiate flow of welding current when the desired maximum electrode force is attained. Thus, force is imparted to the work pieces until its magnitude reaches some point such as "X," whereupon the welding current is initiated, and no greater force is applied thereafter.

Figure 5:
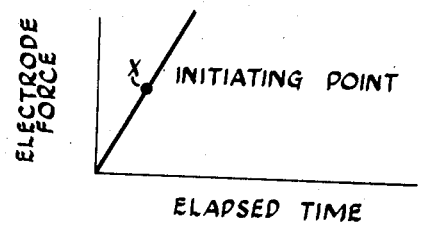
Fig. 5 depicts a desired point of welding current initiation in respect of an electrode force vs. elapsed time curve.
Figure 6:
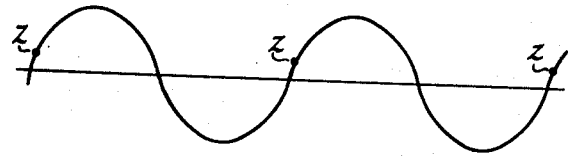
Fig. 6 depicts the characteristic welding current initiation afforded by a synchronous timer.

In order to achieve the improved results of the present invention, the welding current is initiated accurately at a desired intermediate point as the electrode force rapidly increases, as shown in Fig. 5. Such accurate initiation of the welding current could be accomplished readily were it not for the inherent characteristics of synchronous timers usually employed with resistance welders. A synchronous timer will initiate the welding current only at a pre-set instant of the positive half of each cycle of its supply voltage wave, as depicted by "Z" in Fig. 6. Should switch 33 close at some instant on the voltage wave cycle other than "Z," the timer will not initiate the welding current until instant "Z" has been reached. In other words, there can be a delay anywhere from zero to just under one-sixtieth of a second, assuming that a standard 60-cycle supply source is employed, from the time switch 33 is closed until the timer initiates the welding current. Therefore, it is apparent that if the instant of welding current initiation relative to the electrode force varies as much as one-sixtieth of a second, the force imparted to the work pieces will correspondingly vary on consecutive welds.

Figure 7:
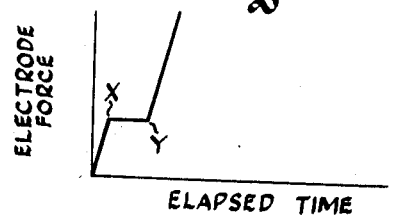
Fig. 7 depicts the electrode force vs. elapsed time relation for a welder incorporating the present invention.

It becomes clear that an electrode force vs. elapsed time relation as depicted in Fig. 7 is desirable. The point "X" at which switch 33 closes is accurately controlled so that the desired force is applied to the work pieces at the instant of initiation of the welding current. The force is maintained substantially constant for a period of time slightly longer than one-sixtieth of a second to insure that the welding current will be initiated while the desired force is being applied. Upon termination of such time delay, application of increasing force is resumed.

The heretofore described welder will produce the improved results depicted in Fig. 7. When compressed air is supplied to the upper chamber of cylinder 35, as previously described, the force imparted to main shaft 5 through springs 34 increases to point "X." At point "X" the pressure in the upper chamber overcomes the combined restraining forces of springs 34 and sleeve 30 moves downwardly relative to the reduced portion 28 of shaft 5 to close sensitive switch 33 to initiate operation of timer ST. While springs 34 continue to stretch and up to the time when sleeve 30 abuts against shoulder 38 the force applied to electrode 2 remains substantially constant as shown by X—Y. The period X—Y is sufficiently long to permit timer ST to initiate the electrode current. The instant of time at which sleeve 30 abuts against shoulder 38 is represented as "Y." Further increase in air pressure in the upper chamber will cause a direct, rapidly increasing force to be imparted to the work pieces through shoulder 38, shaft 5 and movable electrode 2, as represented by the relation beyond "Y" in Fig. 7.

The instant of welding current initiation relative to electrode force is established and controlled by the position of switch 33 relative to arm 32, the strength and degree of preloading of springs 34, and the rate at which air pressure is supplied to the upper chamber. The length of time that substantially constant force is applied to the work pieces is controlled by the predetermined distance between sleeve 30 and shoulder 38 and the rate at which air pressure builds up in the upper chamber.

If it is desired, the welder may be converted readily for use as a magnetic force welder. To prepare for such use, switch 19 in the upper right-hand portion of Fig. 1 is left in its normally open position or, alternatively, cores 10 and 11 may be removed to render coils 12 and 13 ineffective to restrain armature 17 as hereinafter described.

It may be assumed that up to the point of initiation of welding current flow by timer ST the welder operates as hereinbefore described. When timer ST is operated to supply current to the primary winding of transformer 58, current is induced to flow in the circuit including its secondary winding, conductor 60, coil 9, conductor 61, upper electrode 2, work pieces 3, lower electrode 1, and conductor 59. Coil 9 introduces a magnetic field in the air gaps between pole pieces 7 and 8 and armature 17. The attractive force of the magnetic field on armature 17 is transmitted to the work pieces through stop 27, shaft 5 and movable electrode 2. Thus, our magnetic force welder applies a force induced by and varying with the welding current to the work pieces, in addition to the forces imparted by the fluid motor.

Our welder may also be converted readily for use as a magnetic force welder with delayed forging action. To prepare for such use, switch 19 is closed to supply rectified alternating current through conductors 23, 24 and 25, 26 and the windings of coils 12 and 13. Coils 12 and 13 introduce a magnetic field in the air gaps between pole pieces 10 and 11 and armature 17 to attract the armature. It may again be assumed that the fluid motor including cylinder 35 is operated by timer ST as hereinbefore described.

Figure 2:
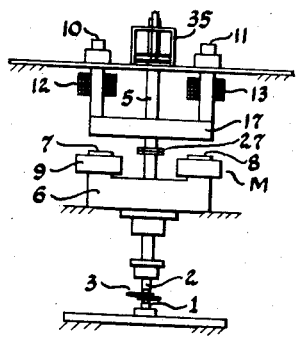
Fig. 2 is a schematic showing of the welder of Fig. 1 depicting the initial operating relation of certain parts when set up for the improved magnetic force type of operation with forging action.
Figure 3:
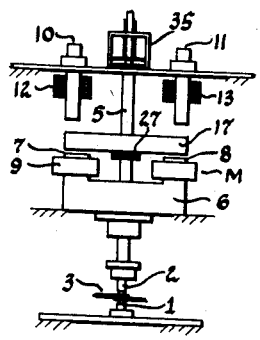
Fig. 3 is a view like Fig. 2, but showing the relation of certain parts at a later stage in their operation and the initial operating relation of certain parts when set up for magnetic force operation without forging action.

When timer ST initiates the welding current, coil 9 of magnetic force device M becomes energized in series with electrode 2 and the secondary winding of transformer 58. The magnetic field at pole pieces 7 and 8 attracts armature 17 which is held in its upper position, as seen in Fig. 2, by the counteracting force of the magnetic field developed at cores 10 and 11. When the attractive force, which is proportional to the welding current, of magnetic force device M builds up sufficiently to overcome the counteracting magnetic field force of cores 10 and 11, armature 17 snaps downwardly to its lower position, as seen in Fig. 3, and strikes stop 27 on the main shaft to impart a hammer blow through electrode 2 onto the work pieces to produce a forging action on the weld. This forging action has been found to increase the area of the weld and give a desirable homogeneity to the weld.

As hereinbefore mentioned cores 10 and 11 are adjustable so that, when armature 17 is in its upper position, as seen in Fig. 2, the distance between armature 17 and stop 27, and consequently the air gap between armature 17 and poles 7 and 8 may be adjusted to adjust the attractive force relative to the restraining force. The restraining force may be adjusted within limits by adjustment of adjustable resistor 20. Stop 27 is adjustable on shaft 5 so that, when the armature is in its lower position as seen in Fig. 3, the latter is always spaced from pole faces 7 and 8 and never sticks to these pole faces. Alternatively, the relative spacing of armature 17 in its final lower position and pole faces 7 and 8 may be adjusted by moving lower electrode 1 vertically by well known means, not shown, or lower electrode 1 may be moved to achieve an approximate adjustment followed by a precise adjustment of stop 27.

In welding of certain types of metal parts it is desirable to provide accurate initial spacing therebetween so that flow of welding current will draw an arc between the parts that will spread over the area to be mated. To facilitate such initial spacing a small nib or projection is provided on one of the parts to bear against the other. It has been found that the operation of the present welder whereby the movable electrode is brought into engagement under the force of gravity at a controlled rate prevents crushing of the nib and hence makes the present welder very suitable for this type of welding. Moreover, magnetic force follow-up which can be obtained with this welder has been found to enhance the quality of such welds.

It will be understood that employment of the magnetic force means alone or in combination with the novel delayed forging action means does not require use of the particular type fluid force means hereinbefore described and may be used in welders having other types of primary welding force applying means as well.

While in connection with the description of operation of the welder for conventional resistive welding coil 9 of the magnetic force means was described as being connected in the electrode circuit, such is not required and if desired coil 9 may be eliminated from the electrode circuit by effecting suitable reconnections.

We claim:

1. A method of welding with a welder having relatively movable electrodes between which the parts to be welded are inserted, at least one of said parts to be welded having an integral projection thereon for contact with the other part to establish initial electrical connection between the parts, said method comprising in the order stated the steps of moving one of said electrodes toward the other electrode under a force including gravity bias to bring the parts to be welded into contact with one another with minimum impact thereby to prevent crushing of said projection, subjecting the parts to be welded to an increasing force until a predetermined value of force has been attained, initiating the flow of welding current through said electrodes to the parts to be welded while said predetermined value of force is being applied, and thereafter applying a supplementary forging force to the parts to be welded to complete the weld.

2. In a projection welder having relatively movable electrodes for applying force and electrical heat to parts inserted therebetween, at least one of said parts to be welded having an integral projection for contact with the other part, fluid power means for moving one of said electrodes toward and away from the other electrode, and control means for said fluid power means operable to initially effect movement of said one electrode toward said other electrode under gravity bias to bring said parts into contact with one another without significant impact thereby to prevent crushing of said projection, said control means comprising means for selectively assisting or retarding said movement of said one electrode under said gravity bias, said control means being thereafter operable to cause said fluid power means to apply a predetermined force to the parts to be welded preparatory to initiation of welding current flow.

3. In a welding system having relatively movable electrodes between which the parts to be welded are inserted, at least one of said parts having a projection thereon for initial abutment against the other part to establish electrical connection therebetween, means for selectively moving one of said electrodes toward and away from the other electrode, control means for said moving means operable to initially effect movement of said one electrode toward said other electrode under a controlled force including gravity bias at a predetermined rate to bring the parts to be welded together with very little impact thereby to prevent crushing of said projection, means responsive to said control means for operating said movable electrode to subject the parts to be welded to a predetermined value of force, means responsive to said control means for initiating the flow of welding current through said electrodes to said parts while said predetermined value of force is being applied, and magnetic force means operable on said one electrode following initiation of welding current flow for subjecting the parts to be welded to a supplementary impact force.

4. In a welding system having relatively movable electrodes between which the parts to be welded are inserted, at least one of said parts having a projection thereon for initial abutment against the other part to establish electrical connection therebetween, means for selectively moving one of said electrodes toward and away from the other electrode, control means for said moving means operable to initially effect movement of said one electrode toward the other electrode under an adjustably controlled force comprising gravity bias at a controlled rate to bring the parts to be welded together with very little impact thereby to prevent crushing of said projection, means responsive to said control means for operating said movable electrode to subject the parts to be welded to a predetermined value of force, means responsive to said control means for initiating the flow of welding current to vaporize said projection and heat the surfaces of the parts around said projection, and magnetic force means operable on said one electrode in response to said current flow reaching a predetermined value for subjecting the parts to be welded to a supplementary impact force.

5. The invention defined in claim 4, wherein said one electrode is provided with an upwardly extending shaft having an armature impacting stop thereon, and said magnetic force means comprises an electromagnet and an armature, said armature normally resting on said stop, a force restraining magnet overlying said armature for restraining application of said supplementary impact force until the downwardly attracting force of said electromagnet overcomes the restraining action, means for energizing said restraining magnet to initially space said armature upwardly from said stop preparatory to applying an impact force, and means for adjusting said initial spacing of said armature from said stop thereby to adjust the time during which the surfaces of the parts are heated by said current flow before said impact force is applied.

6. In a welding system for welding two parts to one another over large areas of their surfaces, one of said parts being provided with a small body of metal projecting therefrom into initial contact with the other part at the center of the areas to be welded for vaporization in response to welding current flow to ionize the space between the parts over said large areas, said system having relatively movable electrodes for applying force and heat to the parts inserted therebetween, in combination, force applying means operable on one of said electrodes, and control means for said force applying means comprising means operable to initially effect movement of said one electrode under a selectively controlled force comprising gravity bias to move one of said parts against the other part without impact until said projecting metal body is in contact with the other part, means for operating said force applying means to increase the force on said one electrode to a predetermined value favorable to flow of electrical current through said metal body, said value of force establishing a distance between said parts as to said large areas favorable to flow of current through said space after ionization thereof by vaporization of said metal body, means responsive to said force reaching said predetermined value for initiating flow of welding current, said current causing vaporization of said metal body and heating of the surfaces of the parts over said large areas to a condition favorable to welding thereof, and means operable in coordination with said current flow for subjecting the parts to a supplementary force having characteristics as to nature, intensity and timing favorable to welding of said surfaces together over said large areas.

7. In a welding system for welding two parts to one another and wherein one of the parts is provided with a projection of small area initially in contact with the other part and which projection is vaporized in response to initial welding current flow to ionize the space between larger areas of the parts, said system having relatively movable electrodes for supplying force and electrical heat to the parts inserted therebetween, in combination, controlled force means operable on one of said electrodes, control means for said force means operable to initially effect movement of said one electrode under the force of gravity to move one of said parts toward the other part without impact until the end of said projection is in contact with the other part, means for operating said force means to increase the force on said one electrode to a predetermined value favorable to flow of electrical energy through said projection, said value of force maintaining the height of said projection and establishing a space between the parts as to their larger areas favorable to flow of electrical energy through said space after ionization thereof by vaporization of said projection, means responsive to said force reaching said predetermined value for maintaining said force substantially constant for a time interval, means responsive to said maintaining means for initiating flow of electrical energy during said time interval, said electrical energy causing vaporization of said projection and heating of the surfaces of the parts over said larger area to a condition favorable to welding thereof by electrical energy flow through the ionized space, and means operable on said one electrode in timed relation to said electrical energy flow to bring the parts together with a supplemental force having characteristics favorable to welding the surfaces of the parts together over said larger areas.

8. In a resistance welder having relatively movable electrodes, fluid power means for moving one of said electrodes toward and away from another electrode, and control means for said fluid power means operable to initially effect movement of said one electrode a predetermined distance toward said other electrode under gravity bias at a controlled rate to bring the parts to be welded into contact with one another without impact and thereafter again move said one electrode under fluid power toward said other electrode to apply a force on the parts.

9. In a welder depending for its operation on a hammer blow transmitted to the work pieces by an armature moving directly under the influence of a magnetic field, first magnetic means for developing said magnetic field, an armature, and second magnetic means for initially holding said armature under the direct influence of its magnetic field in a predetermined position to be released instantly and completely when the magnetic holding force of said second magnetic means is overcome by the magnetic moving force of said first magnetic means.

10. The invention defined in claim 9, together with means for adjusting the minimum spacing between said armature and said first magnetic means.

11. The invention defined in claim 9, wherein said armature is provided with an aperture, a shaft extending through said aperture for guiding said armature and an armature stop on said shaft through which said armature transmits a hammer blow to the work pieces, said armature being freely movable between said second magnetic means and said stop on said shaft.

12. The invention defined in claim 11, together with means for adjusting the initial spacing of said armature from said stop thereby to adjust the characteristics of the force with which said armature impacts against said stop.

13. The invention defined in claim 11, together with a supporting frame, said first magnetic means being rigidly attached to a first portion of said frame, and means for attaching said second magnetic means in an adjustable sliding relation to another portion of said frame and means for adjusting said stop on said shaft whereby said armature is initially spaced a predetermined distance from said stop to prevent the weight of said armature from applying a force against said stop until said first magnetic means is rendered effective to move said armature to apply an impact force on said stop.

14. In a welder having relatively movable electrodes, magnetic force means comprising an armature for applying a force on one of said electrodes in accordance with the value of welding current, means for restraining the application of force on said one electrode by said armature until the attracting force on said armature developed by said magnetic force means preponderates its restraining action, said restraining means being spaced apart from said magnetic force means and said armature moving a predetermined distance under the action of said magnetic force means before applying said force on said one electrode, and means for adjusting said restraining means to adjust its restraining power and to change the initial spacing between said armature and said magnetic force means to thereby adjust the instant in the welding cycle when said force is applied on said one electrode.

15. In a welder having relatively movable electrodes, magnetic force means comprising an armature for applying a force on one of said electrodes in accordance with the value of welding current, means for restraining application of force on said one electrode by said armature until the attracting force on said armature developed by said magnetic force means preponderates its restraining action, said restraining means comprising magnetic means subjecting said armature to counter-attractive force which is overcome by the attractive force of said magnetic force means, and means for adjusting said magnetic means to change the initial spacing between said armature and said magnetic force means to thereby adjust the moment in the welding cycle when said force is applied to said one electrode.

16. In a welder comprising a pair of relatively movable electrodes, a source of welding current supply, and timing means for coupling said source to said electrodes, in combination, means for applying to a movable one of said electrodes a force increasing at a predetermined rate, means responsive to said force reaching a predetermined value for maintaining said force substantially constant for an interval of time sufficient to insure initiation of said welding current, means responsive to said maintaining means at the beginning of said interval for initiating operation of said timing means to couple said welding current to said electrodes during said interval, and means operable in response to termination of said interval for reapplying to a movable one of said electrodes a force increasing at said predetermined rate.

17. In a welder comprising a pair of relatively movable electrodes, a source of welding current supply, and timing means for coupling said source to said electrodes, in combination, means to initiate operation of said timing means to couple said current supply to said electrodes during a predetermined, substantially constant electrode force interval, and means responsive to said current flow reaching a predetermined value for subjecting a movable one of said electrodes to a sudden, momentarily applied supplementary impact force.

18. A convertible type welder comprising a pair of relatively movable electrodes, means for moving one of said electrodes toward the other electrode and applying to parts inserted therebetween a force increasing to a predetermined value, means responsive to said force on the parts attaining a predetermined lower value to maintain the latter value substantially constant for a given interval and thereafter permit said force applied on said parts to increase to the first mentioned value, magnetic force means comprising an energizing coil connected in circuit with said electrodes and an armature for applying a supplementary force on said one electrode in accordance with the value of welding current flowing through said energizing coil, means for rendering said magnetic force means active and inactive selectively, means operable to restrain application of force on said one electrode by said armature until the attracting force on said armature developed by said magnetic force means proponderates its restraining force, and means for rendering the last mentioned means active and inactive selectively.

19. A convertible welder comprising a pair of relatively movable electrodes, a source of welding current supply, timing means for coupling said source to said electrodes, means for moving one of said electrodes toward the other electrode and applying to parts inserted therebetween a force increasing to a predetermined value, means responsive to said force on the parts attaining a predetermined lower value to maintain the latter value substantially constant for a given interval of time, means responsive to the last mentioned means for operating said timing means to couple said welding current to said electrodes during said interval, means responsive to termination of said given interval for resuming application of increasing force on said parts to the first mentioned value, magnetic force means comprising an energizing coil connected in circuit with said electrodes and an armature for applying a supplementary force on said one electrode in accordance with the value of welding current flowing through said coil, selective means for rendering said magnetic force means active and inactive, means operable momentarily to restrain application of said supplementary force on said one electrode by said armature, and selective means for rendering the last mentioned means active and inactive.

20. In a welder comprising a pair of relatively movable electrodes, a source of welding current supply, and timing means for coupling the supply source to the electrodes, in combination, fluid power means for moving one of the electrodes toward the other electrode initially under gravity bias at a controlled rate and thereafter applying through said one electrode to work pieces inserted therebetween a force increasing at a predetermined rate, means responsive to said force reaching a predetermined value for maintaining the value of said force substantially constant for a given time interval to insure initiation of the welding current, means responsive to said maintaining means for initiating operation of said timing means to couple the welding current to the electrodes during said time interval, means responsive to said fluid power means at the end of said time interval for reapplying to the movable electrode a force increasing at said determined rate, magnetic force means comprising an energizing coil connected in circuit with the electrodes and an armature for applying a supplementary force on the movable electrode, means operable to restrain said armature until the attractive force on said armature developed by said magnetic force means overcomes its restraining force, and means responsive to movement of said armature for imparting to the work pieces a sudden momentarily applied impact force.

21. In a welding machine comprising spaced electrode means for applying heat and force to the parts to be welded, in combination, means for applying welding current through the electrode means to the parts to heat the latter, means comprising electromagnetic means and an armature for applying force through the electrode means to the parts under the influence of the magnetic field therein, means for applying a magnetizing current to said electromagnetic means to induce a magnetic field therein, means for presetting the position of said armature toward or away from said electromagnetic means, the characteristics of the electrode force being deing dependent on the preset position of the armature and the characteristics of said magnetizing current, and means for controlling said application of magnetizing current.

22. In a welding system comprising movable electrode means for applying heat and force to the parts to be welded, in combination, means for applying welding current through the electrode means to the parts to heat the latter, means comprising plural pole electromagnetic means and an armature for applying force through the electrode means to the parts, means for applying a magnetizing current to said electromagnetic means to induce a magnetic field therein, said armature being mounted for lateral movement under the influence of said magnetic field in a plane coincident with the plane of the axis of said movable electrode means and the plane of the axis of said plurality of magnetic poles, and means for presetting the position of said armature relative to said electromagnetic means, the characteristics of the electrode force being a function of the preset position of the armature and the characteristics of said magnetizing current.

23. The combination according to claim 22, together with another electromagnetic means acting momentarily to restrain application of said force on the parts by said armature until the attractive force on said armature developed by said magnetic field preponderates its restraining action.

24. In a welding system comprising a movable electrode for applying heat and force to the parts to be welded, in combination, a frame, a shaft slidably mounted in said frame and having said electrode secured to an end thereof, electromagnetic means fixedly mounted in said frame and surrounding said shaft, said electromagnetic means having pole faces on opposite sides of said shaft, an armature stop rigidly secured intermediate the ends of said shaft, an armature surrounding said shaft and mounted thereon for movement toward said pole faces under the influence of said magnetic field in a plane coincident with the plane of the axis of said shaft and the axis of said electromagnetic means, means for applying magnetizing current to said electromagnetic means to attract said armature, said armature transmitting a force through said stop and said shaft to said movable electrode, and means for initiating welding current through said electrode to the parts to heat the latter.

25. In a welding machine comprising a movable electrode for applying heat and force to the parts to be welded, in combination, a stationary frame, a movable shaft slidably mounted in said frame and having said electrode rigidly secured to an end thereof, first electromagnetic means fixedly mounted in said frame and surrounding said shaft, said electromagnetic means having pole faces on opposite sides of the axis of said shaft, second electromagnetic means mounted on said frame adjacent said shaft and having pole faces facing the pole faces of said first electromagnetic means, an armature stop rigidly secured intermediate the ends of said shaft, an armature surrounding said shaft between said stop and said second electromagnetic means and slidably mounted for reciprocal movement in a plane coincident with the plane of the axis of said shaft and the axis of said electromagnetic means, means for energizing said second electromagnetic means to attract said armature to a preset position away from said stop, and means for applying magnetizing current to said first electromagnetic means to cause said armature to move toward said first electromagnetic means when the magnetic force of the latter overcomes the restraining force of said second electromagnetic means and to strike said stop thereby to transmit a forging force to the parts to be welded.

26. In a welding system operable for applying to the parts to be welded accurately controlled heat and electrode force and comprising a movable electrode, in combination, a stationary frame, a movable rod slidably mounted in said frame and having said electrode rigidly secured to the lower end thereof, said frame providing lateral support for said rod while affording free vertical movement of the latter, a plural pole longitudinal relatively flat electromagnet mounted in said frame and having pole faces on opposite sides of the axis of said rod, a longitudinal armature spaced from and overlying said pole faces, means for mounting said armature for movement in a plane coincident with the plane of the axis of said rod and the axes of said electromagnet and armature, a stop on said rod for transmitting force from said armature downwardly through said rod to said movable electrode, said stop being vertically adjustable to predetermine the position of said armature relative to said electromagnet, means for initiating welding current through said electrode to the parts to be welded, and means for energizing said electromagnet to attract said armature, the nature, value and timing of the force transmitted to the parts being a function of the position of said armature and said electromagnet energization.

27. In a welding system operable for applying to the parts to be welded accurately controlled heat and electrode force and comprising a movable electrode, in combination, a frame, a movable rod mounted in said frame and having said electrode mounted at an end thereof, a fluid motor for applying initial force to the parts through said rod, a relatively narrow electromagnet mounted on said frame and having pole faces on opposite sides of the axis of said rod, a relatively narrow armature spaced from said pole faces mounted for movement under the influence of said electromagnet in the plane of the axis of said rod and the axis of said electromagnet, an adjustable stop on said rod for adjusting the preset position of said armature relative to said electromagnet and for transmitting the magnetic force of said armature through said rod to said movable electrode, and means for connecting welding current to said electrode, the magnitude and timing of said magnetic force transmitted to said electrode being a function of the preset position of the armature and the control of energization of said electromagnet.

28. The combination according to claim 27, together with a second electromagnet on the opposite side of said armature from the first mentioned electromagnet and adjustably mounted on said frame for adjustment toward and away from said first mentioned electromagnet, said armature being mounted for free reciprocal movement relative to said second electromagnet and said stop under the influence of said fluid motor and said first mentioned electromagnet respectively, means for energizing said second electromagnet to initially attract said armature away from said stop, said armature applying a supplementary impact forging force through said stop and said rod and said electrode to said parts to be welded when said first mentioned electromagnet overcomes the restraining action of said second electromagnet on said armature, the magnitude and timing of said forging force being a function of the preset position of the stop and second electromagnet relative to the first electromagnet.

29. In an electrical welder having a movable electrode for conducting welding current to the work to be welded and a supporting frame therefor, the improvement comprising a shaft attached to and in axial alinement with the movable electrode and mounted for axial movement in the frame, electromagnetic means fixedly mounted in the frame and having magnetic poles, the magnetic poles being symmetrically arranged on opposite sides of said shaft, a stop on said shaft intermediate the ends thereof, an armature on the opposite side of said stop from said electromagnetic means and having pole faces in alinement with the poles of said electromagnetic means, said armature moving under the influence of the magnetic field in a plane comprising the axis of said shaft and the axis of said magnetic poles to transmit a force through said stop and said shaft and movable electrode to the work to be welded.

30. The invention defined in claim 29, together with means for adjusting said stop along the axis of said shaft.

31. The invention defined in claim 29, together with means for initially restraining said armature from applying a force on said stop until the magnetic force on said armature overcomes the effect of said restraining means.

32. The invention defined in claim 31, wherein said restraining means comprises holding electromagnetic means on the opposite side of said armature from said stop, said holding means having magnetic poles in the plane of the shaft and the poles of the first mentioned electromagnetic means for initially attracting said armature away from said stop and restraining said armature until the magnetic force of said holding means is overcome by the greater magnetic force of said first mentioned electromagnetic means, said greater magnetic force thereupon effecting movement of said armature to impart a hammer blow on said stop.

33. The invention defined in claim 32, together with means for mounting said holding electromagnetic means on said frame to afford adjustment of the magnetic poles thereof relative to said armature.

34. The invention defined in claim 29, together with additional means associated with said shaft for selectively applying force axially of said shaft to move said electrode toward or away from the work to be welded.

35. The invention defined in claim 29, together with fluid operated means for applying initial force through said shaft and the movable electrode to the work to be welded.

36. In a welding system, relatively movable electrodes between which the parts to be welded are inserted, a source of electrode current connectable to said electrodes, fluid power means for moving one of said electrodes toward the other electrode and applying to the parts inserted therebetween an increasing force, said fluid power means further comprising means responsive to said force reaching a predetermined value for maintaining said force substantially constant for a given time interval to insure application of the electrode current and means for reapplying said increasing force after said time interval, means responsive to operation of said maintaining means for initiating flow of said electrode current, and magnetic means responsive to said current flow reaching a predetermined value for subjecting said one electrode to a sudden supplementary impact force.

37. In a welding system, a movable electrode, a fluid-operated cylinder for moving said electrode toward and away from the work pieces to be welded, means for transmitting fluid pressures from said cylinder to said electrode, said means comprising a first longitudinal member connecting said cylinder to said electrode for moving said electrode away from the work pieces and a second member concentric with said first member connected between said cylinder and said first member for moving said electrode toward the work pieces, means for providing restricted movement of said second member relative to said first member and for biasing said second member in one direction, means for applying fluid pressure to said cylinder for moving said electrode through said second and first members with an increasing force, means responsive to said force reaching a predetermined value for moving said second member relative to said first member to maintain said force substantially constant, and means responsive to termination of said restricted movement of said second member for reapplying an increasing force to said electrode.

38. The invention defined in claim 37, wherein said first member is connected to said second member by spring means for maintaining said force substantially constant during relative movement of said members, and said first member is provided with a stop for engagement by said second member to reapply an increasing force to said electrode.

39. In a welding system, a movable electrode, a fluid-operated cylinder for moving said electrode toward and away from the work pieces to be welded, a shaft connected to said electrode, a concentric member connected to said cylinder for moving said shaft, said concentric member being axially movable between restricted limits on said shaft and being biased in one direction, a source of welding current supply, timing means for coupling said source to said electrode, means for applying fluid pressure to said cylinder for moving said concentric member and said shaft in unison to apply increasing force to said electrode, means responsive to said force reaching a predetermined value for effecting movement of said concentric member relative to said shaft to maintain said force substantially constant for a given interval, means responsive to said relative movement for operating said timing means to couple said source to said electrode during said interval, and means responsive to termination of said relative movement for reapplying an increasing force to said electrode.

References Cited in the file of this patent

UNITED STATES PATENTS

| | | |
|---|---|---|
| 1,174,446 | Rietzel | Mar. 7, 1916 |
| 2,224,733 | Konig et al. | Dec. 10, 1940 |
| 2,232,038 | Stone et al. | Feb. 18, 1941 |
| 2,286,104 | Platz | June 9, 1942 |
| 2,299,543 | Humphrey | Oct. 20, 1942 |
| 2,313,941 | Humphrey et al. | Mar. 16, 1943 |
| 2,337,302 | Seeloff | Dec. 21, 1943 |
| 2,363,753 | Smith et al. | Nov. 28, 1944 |
| 2,383,695 | Thacker | Aug. 28, 1945 |
| 2,401,528 | Vang | June 4, 1946 |
| 2,464,967 | Dinnick | Mar. 22, 1949 |
| 2,473,772 | Vang | June 21, 1949 |
| 2,474,816 | Briggs | July 5, 1949 |
| 2,731,534 | Hansen et al. | Jan. 17, 1956 |

FOREIGN PATENTS

| | | |
|---|---|---|
| 786,802 | France | June 17, 1935 |